United States Patent

Dasinger et al.

[15] 3,644,175
[45] Feb. 22, 1972

[54] DETOXIFICATION OF GRAM-NEGATIVE BACTERIA GROWN IN A FERMENTATION PROCESS

[72] Inventors: Bruce L. Dasinger, Scotch Plains; Lars A. Naslund, Morganville, both of N.J.

[73] Assignee: Esso Research and Engineering Company

[22] Filed: July 8, 1968

[21] Appl. No.: 743,012

[52] U.S. Cl. .................................195/28 R, 195/49, 195/96
[51] Int. Cl. .........................................................C12d 13/06
[58] Field of Search .....................................195/121, 28, 49

[56] References Cited

UNITED STATES PATENTS 3,427,223   2/1969   Frankenfeld et al........................195/1

OTHER PUBLICATIONS

Hayashi, O. Oxygenases pages 245– 7 Academic Press, New York, N.Y. 1962.

*Primary Examiner*—A. Louis Monacell
*Assistant Examiner*—Seymour Rand
*Attorney*—Manahan and Wright and W. O. Heilman

[57] ABSTRACT

The present invention is concerned with the detoxification of gram-negative bacteria produced in an aerobic biosynthesis fermentation process. It is preferred that the detoxification be carried out at elevated temperatures using an inorganic or organic acid. Preferred acids comprise inorganic and organic acids, such as hydrochloric and acetic acids.

7 Claims, No Drawings

DETOXIFICATION OF GRAM-NEGATIVE BACTERIA GROWN IN A FERMENTATION PROCESS

Thus, the present invention is broadly concerned with an aerobic biosynthesis fermentation process. More particularly, the invention is concerned with the detoxification of gram-negative bacteria grown in a fermentation process wherein the primary source of carbon is a carbohydrate such as molasses, wood hydrolysis sugar and papermaking lyes, or a hydrocarbon feed, preferably a petroleum hydrocarbon such as a $C_{10}$ to $C_{30}$ n-aliphatic hydrocarbon or an oxygenated hydrocarbon. A preferred method of detoxification is to expose the gram-negative organism to acid at elevated temperatures which results in loss of biological activity. The process may be carried out continuously or batchwise.

The present world shortage of protein, especially low-cost proteins, for consumption by animals and humans, is well known. In an attempt to alleviate this protein shortage, there have recently been developed several biosynthesis processes wherein biologically produced protein is provided by the growth of micro-organisms on various carbon-containing substrate materials. One such technique involves growing various micro-organisms, such as yeast and bacteria, on carbohydrate substrates. However, this technique depends upon the availability of large quantities of relatively expensive carbohydrates which add significantly to the cost of the process and product. Another recent, and even more promising, technique for biologically synthesizing food protein is by cultivating the micro-organisms on petroleum hydrocarbon substrates. This type of protein fermentation synthesis is usually conducted in an aqueous biosynthesis bath containing a hydrocarbon feed, an inoculant of the micro-organism to be grown, an aqueous growth medium, oxygen, nitrogen and other indispensable nutrients. This technique allows the use of hydrocarbon feeds, which are widely available in the necessary quantities and are less expensive than carbohydrates. It is also known to use various biological catalysts in fermentation processes. The process of the present invention is applicable to the biosynthesis of all micro-organisms which are capable of growth on hydrocarbon feeds, since most bacteria that grow rapidly on hydrocarbon or hydrocarbon-derived substrates are gram negative. All gram-negative bacteria contain endotoxin, lipopolysaccharide, as a constituent of their cell walls. This material is toxic for humans and animals and, therefore, it is necessary to inactivate it in the cells which are to be used as food. The present process destroys both the activity of the endotoxin common to all gram-negative bacteria and also increases the protein content and the protein quality of the product bacteria by physical and chemical means, thereby producing a high-quality protein food.

While the present invention is applicable to a broad scope of operable micro-organisms, there are a number of micro-organisms which are especially suitable for assimilation of petroleum hydrocarbons and oxidized petroleum hydrocarbons. Suitably, the bacteria are of one of the orders: Pseudomonadales or Eubacteriales. Preferably, the bacteria which are employed are of the family Pseudomonadaceae, Azotobacteraceae, Rhizobiaceae and Achromobacteraceae. Preferred species are tabulated hereinbelow, along with their identification numbers such as A.T.C.C. registration numbers which were secured by depositing samples with the American Type Culture Collection, 212 M Street, Northwest, Washington 7, D.C.

| Micro-organism name | A.T.C.C. number |
| --- | --- |
| Pseudomonas ligustri | 15522 |
| Pseudomonas pseudomallei | 15523 |
| Pseudomonas orvilla | 15524 |
| Alcaligenes sp. | 15525 |
| Micrococcus cerificans | 14987 |

The *Micrococcus cerificans* (14987), which was isolated and identified by Dr. R. E. Kallio et al, *Journal of Bacteriology*, Vol. 78, No. 3, pp. 441–448 (September 1959), is particularly desirable. Further identification is as follows:

MORPHOLOGY

Cells are small, spherical, tending to be elliptical in old cultures and media high in nitrogen.

Cells from defined media average 0.5 to 1.0 microns in diameter, and from complex media cell diameters average 1.0 to 2.0 microns. Cells occur singly or in clumps. Immotile, metachromatic granules and sudanophilic granules are not observed.

GRAM REACTION

Negative.

Colonies on defined agar are small (1 mm.), circular convex, having entire edge. Colonies on nutrient agar are larger (2 to 5 mm.), raised mucoid, generally round.

Within a species there can be many different strains comprising variations and both natural and induced mutants.

The morphology and growth reaction characteristics of other organisms listed above are given in U.S. Pat. No. 3,308,035 issued Mar. 7, 1967 entitled, "Process for Producing a High-Protein Composition by Cultivating Micro-organisms on an N-Aliphatic Hydrocarbon Feed," inventor John D. Douros, Jr.

While the preceding gram-negative organisms are preferred, it should be remembered that the present invention in its broadest aspects is not necessarily limited to the specific organisms listed above. Any gram-negative organisms capable of growth on a substrate may be used.

The growth media comprise an aqueous mineral salt medium and excess oxygen. Oxygen is supplied to the cultivation substrate medium or broth in any form capable of being assimilated readily by the inoculant micro-organism. Oxygen-containing compounds may also be used to supply oxygen as long as they do not adversely affect micro-organism cell growth and the conversion of the oxidized hydrocarbon feed to micro-organism cells. Oxygen may be supplied as an oxygen-containing gas, such as air at atmospheric or elevated pressure, or oxygen-enriched air wherein the oxygen concentration may be up to 70 to 90 percent. In general, between about 0.1 and about 10, preferably between about 0.8 and about 2.5 volumes per minute of air are supplied to the reactor per volume of liquid in the fermentor.

Nitrogen is essential to biological growth. The source of nitrogen may be any organic or inorganic nitrogen-containing compound which is capable of releasing nitrogen in a form suitable for metabolic utilization by the growing micro-organism. Suitable organic nitrogen compounds are, for example, proteins, acid-hydrolyzed proteins, enzyme-digested proteins, amino acid, yeast extract, asparagine, and urea. Suitable inorganic nitrogen compounds are ammonia, ammonium hydroxide, nitric acid or salts thereof, such as ammonium phosphate, ammonium citrate, ammonium sulfate, ammonium nitrate and ammonium acid pyrophosphate. A very convenient and satisfactory method of supplying nitrogen to the process is to employ ammonium hydroxide, ammonium phosphate or ammonium acid phosphate, which can be added as the salt per se or which can be produced in situ in the aqueous fermentation media by bubbling ammonia gas or gaseous ammonia through the broth or injecting aqueous ammonium hydroxide into the broth to which phosphoric acid was previously added, thereby forming ammonium acid phosphate. In this way, the desired pH range of about 5.0 to 8.5 such as about 7.0, is maintained and the requisite nitrogen supplied.

Ammonium hydroxide may be supplied to the biosynthesis bath in amounts of between about 0.08 and about 0.20, preferably between about 0.1 and about 0.15, gram of nitrogen per gram of dried cells produced. This amounts to between about 0.01 and about 1.0 weight percent, preferably between about 0.1 and about 0.15 weight percent, nitrogen based on the total biosynthesis bath.

In addition to the oxygen and nitrogen, it is necessary to supply requisite amounts of selected mineral nutrients in the feed medium in order to ensure proper micro-organism growth and maximize the assimilation of the oxidized hydrocarbon by the micro-organism cells. Potassium, sodium, iron, magnesium, calcium, manganese, phosphorous, and other nutrients are included in the aqueous growth medium. These necessary materials may be supplied by any technique but are preferably supplied by their water-soluble salts.

Potassium may be supplied as potassium chloride, potassium phosphate, potassium sulfate, potassium citrate, potassium acetate and potassium nitrate. Iron and phosphorous may be supplied in the form of their sulfates and phosphates, such as iron sulphate and iron phosphate. Usually, most of the phosphorous is supplied as ammonium phosphates. When either ammonium phosphate or ammonium acid phosphate is used, it serves as a combined source of both nitrogen and phosphorous for the micro-organism cell growth.

One satisfactory composition for the fermentation media particularly for bacteria at the outset of fermentation is as follows:

| Component | Concentration (grams per liter) | | |
|---|---|---|---|
| | Can use | Usually use | Preferably use |
| Oxygenated Hydrocarbons | 4–120 | 5–80 | 10–50 |
| $K_2HPO_4$ | 0.5–15 | 1–10 | 2–8 |
| $(NH_4)_2HPO_4$ | 5–15 | 7–13 | 8–12 |
| $Na_2SO_4$ | 0.1–1.0 | 0.2–0.9 | 0.3–0.8 |
| $FeSO_4 \cdot 7H_2O$ | 0.002–0.5 | 0.005–0.04 | 0.01–0.03 |
| $MgSO_4 \cdot 7H_2O$ | 0.1–0.7 | 0.2–0.6 | 0.3–0.5 |
| $MnSO_4 \cdot 7H_2O$ | 0.002–0.05 | 0.005–0.04 | 0.01–0.03 |
| NaCl | 0.002–0.05 | 0.005–0.04 | 0.01–0.03 |
| Water | Remainder to equal 100 wt. % | | |

Other optional mineral nutrients which may be included in trace amounts include:

| Component | Concentration (milligrams per liter) | | |
|---|---|---|---|
| | Can use | Usually use | Preferably use |
| $ZnSO_4 \cdot H_2O$ | 0–0.4 | 0–0.3 | 0–0.2 |
| $Na_2MoO_4 \cdot H_2O$ | 0–0.06 | 0–0.05 | 0–0.04 |
| $CoCl_2$ | 0–1.2 | 0–1.1 | 0–1.2 |
| $H_3BO_3$ | 0–0.08 | 0–0.07 | 0–0.06 |
| $CuSO_4 \cdot 5H_2O$ | 0–0.3 | 0–1.25 | 0–0.2 |
| $CaCl_2 \cdot 6H_2O$ | 0–0.14 | 0–0.13 | 0–0.12 |
| $NiCl_2 \cdot 6H_2O$ | 0–0.01 | 0–0.008 | 0–0.006 |

The essential and optional nutrients may be supplied in the form of other salts or acids than those tabulated hereinabove.

A very satisfactory medium is prepared as follows:

$P_1$ Medium

| | Grams/liter of tap water |
|---|---|
| $(NH_4)_2HPO_4$ | 10 |
| $K_2HPO_4$ | 5 |
| $Na_2SO_4$ | 0.5 |

To the above is added 10 cc./liter of a salt solution A prepared as follows:

| Salt Solution A | Grams/liter distilled water |
|---|---|
| $MgSO_4 \cdot 7H_2O$ | 40 |
| $FeSO_4 \cdot 7H_2O$ | 2 |
| $MnSO_4 \cdot 4H_2O$ | 2 |
| NaCl | 2 |

The foregoing $P_1$ medium has a pH of 7.8. A variation of the above is one in which phosphate is supplied in the form of phosphoric acid.

The temperature of the biosynthesis bath may be varied between about 20° C. and about 65° C. depending upon the specific micro-organism being grown, but preferred temperatures when using bacteria are between about 25° C. and about 45° C., such as about 35° C. The pH is preferably in the range from 5.5 to 8.5 such as about 7.0.

The carbon source, preferably the sole carbon source, for the fermentation can be a carbohydrate such as molasses, wood hydrolysis sugar and paper making lyses or a hydrocarbon feed.

Thus, the present invention may utilize oxygenated materials such as oxygenated natural gas and oxygenated hydrocarbon petroleum fractions boiling up to about 900° F. and particularly those containing from about $C_1$–$C_{30}$ carbon atoms. These compounds are selected from alcohols, esters, aldehydes, ketones and acids. Preferred oxygenated compounds are the alcohols, especially ethyl alcohol. Other desirable oxygenated compounds are, for example, isopropyl alcohol, methyl ethyl ketone, acetic acid, glycols, butyl alcohol, acetone, octanol, decanoic acid, dibutyl ester of sebacic acid and dimethyl adipate. Suitable alcohols are methanol, ethanol, n-propanol, isopropanol, $C_4$–$C_{30}$ primary alcohols, straight chain or branched, 2-ethyl hexanol, isooctyl alcohol, glycol, glycerine, cyclohexanol, $C_4$–$C_{30}$ secondary alcohols from either n or isoparaffin feeds, monoethoxylates of secondary alcohols, and crotyl alcohol (unsaturated $C_4$ alcohol). Suitable ketones and aldehydes are acetone, MEK (methylethyl ketone), MIBK (methylisobutyl ketone), isoborone, cyclohexanone, cyclopentanone, stearyl aldehyde, lauryl aldehyde, acetaldehyde, and crotonaldehyde (unsaturated $C_4$ aldehyde). Suitable acids are acetic acid, propionic acid, caproic acid, capric acid, lauric acid, oleic acid, stearic acid, linoleic acid, prachidic acid, toluic acid, oxalic acid, sebacic acid, terephthalic acid, phthalic acid, malonic acid, hexahydromellitic acid, and crotonic acid (unsaturated $C_4$ acid). Suitable esters are methyl acetate, ethyl acetate, ethyl butyrate, ethyl stearate, glycol diacetate, isopropyl valerate, dimethyl phthalate, glyceryl trioleate, and sec-$C_{12}$ alcohol acetate; and suitable ethers are ethoxylates, diethyl ether, tetrahydrofurane, and diisopropylether.

Petroleum gases, such as methane, ethane, propane and butane, can be air oxidized to alcohols, ketones, aldehydes, ethers and acids by conventional methods, such as a raining solids technique or in a packed bed reactor. As mentioned, oxidized substrates are preferably derived from hydrocarbon fractions containing from about $C_1$–$C_{30}$ carbon atoms especially those having from about $C_1$–$C_5$ carbon atoms. Other hydrocarbon feeds which can be utilized for the present process are $C_{10}$–$C_{30}$ petroleum hydrocarbon feeds, preferably gas oils boiling in the range of between about 190° C. and about 400° C., preferably between about 190° C. and about 320° C. Other suitable feeds are $C_{10}$–$C_{30}$ normal and isoparaffins, cycloparaffins, monoolefins, diolefins, aromatics and mixtures thereof. A preferred feed is one which contains a substantial weight percentage, e.g., about 70+ weight percent, of normal (straight chain) paraffin hydrocarbons having from about 10 to 30 carbon atoms. While the presence of branched, nonaromatic hydrocarbons in amounts of up to 30 percent by weight in the hydrocarbon feed can be tolerated, concentrations in excess of 10 weight percent of nonnormal, nonaromatic hydrocarbons are usually avoided since the preferred micro-organism cells employed in the present process are selective preferentially to normal hydrocarbons, especially small n-paraffins. Therefore, the use of branched paraffins is preferably avoided.

A very desirable hydrocarbon feed is a $C_{10}$–$C_{30}$ feedstock, which has been purified to reduce the level of aromatics, both polycyclic and monocyclic, to below about 0.5 weight percent, preferably below about 0.1 weight percent, more preferably below about 100 p.p.m.

As pointed out heretofore, the gram negative organisms which grow under the conditions as set forth contain endotoxin a toxic material which must be inactivated. In accordance with the present invention, detoxification is carried out at elevated temperatures in conjunction with an acid treatment. Thus a fermentation process is conducted utilizing a micro-organism under fermentation conditions as hereinbefore specified to produce protein cells. An aqueous effluent containing the product fermentation bacteria cells is passed to a suitable device, such as a filter or centrifuge, to effect concentration and separation of the cells from the remainder of the effluent. The concentrated product is then passed to a detoxification vessel which may comprise a plurality of vessels. In the detoxification vessel the concentrated aqueous effluent containing the micro-organism cells is acidified to lower the pH to within a range of from about 1.0 to 6.0. A preferred range is from about 1.1 to 2.75 as, for example, a pH of about 2.0.

The acid employed to effect the acidification can be any inorganic or organic acid. Exemplary acids which can be used in accordance with the process of this invention to detoxify microbial cells to be used as food or feed supplement include, but are not limited to, the following: phosphoric acid; orthophosphoric acid; metaphosphoric; pyrophosphoric; acetic acid; propionic acid; butyric acid; lower alkyl substituted phosphinic acids, e.g., methyl phosphinic acid, orthophosphorous acid; meta phosphorous acid, hydrochloric acid; sulfuric acid; nitric acid, mixtures of any two or more of the above-mentioned acids. Of the acids listed, hydrochloric acid is the preferred acid.

After addition of the acid, the acidified effluent is heated. Usually, the acidified effluent is heated to a temperature ranging from about 60° C. to about 141° C., preferably in the range from about 110° to 130° C., such as about 121° C., for a time period ranging from 10 seconds to 30 minutes, and more preferably about 10 minutes. The specified acid, temperature and times used in any given situation will depend on the specific micro-organism being detoxified and the amount of entotoxin present. Under certain conditions it may be desirable to first heat the effluent prior to adding the acid so as to reduce the pH.

After detoxification the cells may be washed or passed directly to any suitable drying device, such as a spray dryer, drum dryer, freeze dryer, tray dryer, oven dryer or any other drying procedure or combination of procedures. After detoxification and before drying, the pH of the product bacterial cells is adjusted with a suitable base such as calcium hydroxide or sodium hydroxide to a pH in the range from about 6.0 to 7.0, such as about 6.5.

The present invention may be more fully understood by the following example illustrating adaptation of the same:

EXAMPLE 1

Micrococcus cerificans ATCC No. 14987 was grown aerobically at 30° C. at 300 r.p.m. using 1 percent ethyl alcohol as the sole source of carbon. The freshly grown cells were concentrated and adjusted to a final concentration of 100 grams per liter. This product was divided into four groups for further treatment. The treatment of the various groups is summarized in Table I.

The cell broth treated as described with respect to Table I were tested in mice for acute intraperitoneal toxicity. Four groups of 10 male albino mice, weighing from 18 to 25 grams, were each injected intraperitoneally with 0.2 ml. (20 mg.) of one of the treated cell broths. One group of 10 male albino mice having the same weight range were injected intraperitoneally with 0.2 ml. of the "control" (Sterile Saline Solution). The animals were observed frequently for early manifestations of intoxication for 1 hour after dosing and then daily for 21 days. The results of these tests are set forth in the table below.

TABLE II

Acute Intraperitoneal Toxicity of Treated Cells For Mice 0.2 cc. (20 mg.) Micrococcus cerificans injected intraperitoneal

| Group | Treatment | Dead/dosed | % Deaths |
|---|---|---|---|
| A | Untreated | 10/10 | 100 |
| B | heat-treated | 9/10 | 90 |
| C | Acetic acid and heat | 2/10 | 20 |
| D | HCl and heat | 0/10 | 0 |
|   | Control (sterile saline solution—no cells) | 0/10 | 0 |

As will be noted from the above data, the group C and D samples, which were treated in accordance with this invention, yielded far greater detoxification than the group A sample which was treated or the group B sample which was only heat treated. This example shows the necessity of both acid and heat treatment to effect detoxification. The protein content, essential amino acid index and amino acid profile of Micrococcus cerificans treated in accordance with Table I were determined using the customary analytical procedures and calculations.

The protein content (expressed as a percent) is calculated from the determined weight percent nitrogen (as determined by the Kjeldahl method) of the cells by multiplying by a factor of 6.25.

The essential amino acid index of the treated cells is determined using the conventional method employing egg as a basis for comparison. Egg is considered as a perfect protein having an essential amino acid index (E.A.A.) of 100.0.

In determining the amino acid profiles of the treated cells, chromatographic analysis was used to determine all listed

TABLE I.—DETOXIFICATION TREATMENT OF MICROCOCCUS CERIFICANS

[Freshly grown Micrococcus cerificans cells adjusted to 100 gms./l.]

| Group A | Group B | Group C | Group D |
|---|---|---|---|
| Untreated cell broth adjusted to pH 6.0. | Cell broth adjusted to pH 6.0 Heat treated at 120° C. for 10 minutes. | Cell broth adjusted to pH 2.75 with acetic acid. Heat treated at 210° C. for 10 minutes. | Cell broth adjusted to pH 1.1 with concentrate HCl. Heat treated at 120° C. for 10 minutes. |
| Washed 4X with saline solution cells adjusted to 100 mg./cc. | Cooled, washed 4X with saline solution cells adjusted to 100 mg./cc. | Cooled pH adjusted to 6.0 with NaOH. Washed 4X with saline solution cells adjusted to 100 mg./cc. | Cooled pH adjusted to 6.0 with NaOH. Washed 4X with saline solution cells adjusted to 100 mg./cc. | components with the exception of tryptophan, which was determined by microbiological assay.

The protein content, essential amino acid indexes and amino acid profiles for the treated cells are indicated in the following Table III.

TABLE III.—AMINO ACID CONTENT

| Amino acids | Group— A Untreated | B Heat treated | C Acetic acid heat treat | D HCL plus heat treat |
|---|---|---|---|---|
| | Grams amino acid/100 grams protein | | | |
| Alanine | 4.9 | 8.0 | 7.1 | 8.2 |
| Arginine | 4.7 | 5.5 | 4.2 | 5.4 |
| Aspratic acid | 9.0 | 10.0 | 7.8 | 10.1 |
| Cysteic acid | 0 | 0 | 0.2 | 0 |
| Cystine | 0.3 | 0.9 | 0.6 | 0.4 |
| Glutamic acid | 10.4 | 10.8 | 9.6 | 14.3 |
| Glycine | 3.3 | 4.2 | 3.4 | 4.2 |
| Histidine | 2.5 | 2.8 | 2.3 | 3.6 |
| Isoleucine | 3.5 | 5.4 | 5.2 | 5.7 |
| Leucine | 4.9 | 7.1 | 6.2 | 10.4 |
| Lysine | 4.6 | 5.6 | 4.2 | 5.4 |
| Methionine | 1.2 | 1.2 | 1.5 | 1.1 |
| Meth. sulfoxide | 0.1 | 0.6 | 0.3 | 1.5 |
| Phenylalanine | 2.7 | 3.8 | 3.6 | 5.7 |
| Proline | 2.4 | 3.1 | 3.3 | 3.2 |
| Serine | 2.9 | 3.8 | 3.1 | 3.8 |
| Threonine | 3.6 | 4.7 | 3.7 | 4.7 |
| Syrosine | 2.1 | 3.2 | 2.6 | 3.7 |
| Valine | 4.4 | 5.5 | 4.7 | 6.8 |
| Total grams amino acids 100 grams protein | 67.5 | 86.2 | 73.6 | 98.2 |
| Percent increase in total amino acid content over untreated cells | 0 | 27.7 | 9.0 | 45.5 |
| Prcent EAA based on hen egg | 55.1 | 76.5 | 66.0 | 91.3 |

As will be noted from the foregoing data, it is apparent that the combined treatment of heat and hydrochloric acid detoxifies the cells of *Micrococcus cerificans* to the extent that it is comparable with intraperitoneal injections of Casein. Casein was chosen as a reference protein since it is the principal protein in milk and is widely used as a human food source. *Micrococcus cerificans*, when treated in accordance with this invention, possesses the valuable combination of a safe nontoxic product, high protein content in excess of 60 percent, a high essential amino acid index in excess of 65 percent, and a nutritionally attractive amino acid profile. The increase in amino acid content (10–45 percent) after treatment, is due to the removal and breakdown of lipopolysaccharides and other nonamino acid compounds, thus further indicating the use of the present invention to produce a wholesome and nutritious protein food supplement by biosynthesis in an extremely economical manner. Thus, the present invention is especially useful in preparing human or animal feed supplements which are nontoxic and have significant protein and overall nutritional value.

We claim:

1. Improved process for producing high-quality protein utilizing a gram-negative bacteria which comprises inoculating an aerobic fermentation bath containing a source of carbon and other essential nutrients with a gram-negative bacteria under fermentation conditions, thereafter separating the fermentation cell product from the remainder of the effluent cells and acidifying the cells to a pH in the range from about 1.1 to 2.75 and subjecting said acidified cells to a temperature in the range from about 110° C. to about 130° C., thereafter cooling and recovering the high-quality protein.

2. Process as defined by claim 1 wherein said micro-organism is selected from the class consisting of:

| Micro-organism name | A.T.C.C. number |
|---|---|
| Pseudomonas ligustri | 15522 |
| Pseudomonas pseudomallei | 15523 |
| Pseudomonas orvilla | 15524 |
| Alcaligenes sp. | 15525 |
| Micrococcus cerificans | 14987 |

3. Process as defined by claim 1 wherein said source of carbon comprises ethyl alcohol.

4. Process as defined by claim 1 wherein said micro-organism comprises *Micrococcus cerificans* A.T.C.C. No. 14987.

5. Improved process for the production of high-quality protein utilizing a gram-negative bacteria which comprises inoculating an aerobic fermentation bath with a gram-negative bacteria containing a petroleum hydrocarbon as a source of carbon, carried out under fermentation conditions, withdrawing the fermentation product and concentrating the protein cells, then adjusting the pH in the range from about 1.1 to 2.75 and maintaining the temperature in the range from about 110° to 140° C. for a time period from about 10 to 30 minutes, thereafter recovering said high quality protein.

6. Process as defined by claim 5 wherein said micro-organism is selected from the class consisting of:

| Micro-organism name | A.T.C.C. number |
|---|---|
| Pseudomonas ligustri | 15522 |
| Pseudomonas pseudomallei | 15523 |
| Pseudomonas orvilla | 15524 |
| Alcaligenes sp. | 15525 |
| Micrococcus cerificans | 14987 |

7. Process as defined by claim 5 wherein said micro-organism comprises *Micrococcus cerificans* A.T.C.C. No. 14987.

* * * * *